United States Patent [19]

Gasser et al.

[11] Patent Number: 5,339,942
[45] Date of Patent: Aug. 23, 1994

[54] APPARATUS FOR INTRODUCING ARTICLES INTO A STORAGE DEVICE

[75] Inventors: Markus Gasser, Gächlingen, Switzerland; Hauke Schneider, Lottstetten, Fed. Rep. of Germany

[73] Assignee: Sig Schweizerische Industrie-Gesellschaft, Neuhausen am Rheinfall, Switzerland

[21] Appl. No.: 167,124

[22] Filed: Dec. 16, 1993

Related U.S. Application Data

[63] Continuation of Ser. No. 950,319, Sep. 24, 1992, abandoned.

[30] Foreign Application Priority Data

Sep. 24, 1991 [CH] Switzerland ............ 2836/91-0

[51] Int. Cl.⁵ .................................. B65G 1/00
[52] U.S. Cl. ...................... 198/347.1; 198/463.2
[58] Field of Search ............ 198/347.1, 432, 434, 198/463.2, 463.4

[56] References Cited

U.S. PATENT DOCUMENTS

| | | | |
|---|---|---|---|
| 1,766,142 | 6/1930 | Olson | 198/463.2 |
| 1,901,928 | 3/1933 | Olson . | |
| 1,911,984 | 5/1933 | Allen . | |
| 1,912,898 | 6/1933 | Jennings et al. | 198/463.2 |
| 3,093,233 | 6/1963 | Klenk | 198/432 |
| 3,370,689 | 2/1968 | van der Winden | 198/463.2 X |
| 3,384,218 | 5/1968 | Messerly et al. | 198/463.2 |
| 3,587,895 | 6/1971 | Kornylak . | |
| 4,953,688 | 9/1990 | Kross | 198/434 |

FOREIGN PATENT DOCUMENTS

| | | | |
|---|---|---|---|
| 2803320 | 8/1979 | Fed. Rep. of Germany ... | 198/347.1 |
| 2159787 | 12/1985 | Fed. Rep. of Germany ... | 198/347.1 |

Primary Examiner—James R. Bidwell
Attorney, Agent, or Firm—Spencer, Frank & Schneider

[57] ABSTRACT

An apparatus for introducing articles into a storage device includes a feeder conveyor for advancing articles toward the storage device in a direction of advance; a support for movably supporting the feeder conveyor such that its discharge end is movable in a direction transverse to the direction of advance of articles on the feeder conveyor and generally parallel to a direction of motion of article-supporting elements of the storage device at the inlet thereof; a drive for moving the feeder conveyor in the direction of advance; a drive for moving the support to thus displace its discharge end transversely to the direction of advance; and an arrangement for synchronizing the motion of the discharge end of the feeder conveyor with the motion of a selected one of the article-supporting elements for transferring articles from the feeder conveyor to the selected article-supporting element during simultaneous motions of the article-supporting elements, of the feeder conveyor in the direction of advance, and of the discharge end in a direction transverse to the direction of advance.

14 Claims, 5 Drawing Sheets

APPARATUS FOR INTRODUCING ARTICLES INTO A STORAGE DEVICE

CROSS REFERENCE TO RELATED APPLICATION

This application is a continuation of application Ser. No. 07/950,319, filed Sep. 24, 1992, now abandoned.

This application claims the priority of Swiss Application No. 2836/91-0 filed Sep. 24, 1991, which is incorporated herein by reference.

BACKGROUND OF THE INVENTION

This invention relates to a method and an apparatus for introducing flat products, arranged in consecutive rows, to a storage device, particularly a flow-through article-storing device. The apparatus includes a feeding device disposed externally of the storage device, in the region of an article inlet thereof for transferring the article rows to storage shelves of the storage device. The storage shelves move, for example, consecutively past the inlet and consecutively present the stored articles at an outlet of the storage device.

In the packaging operation for wrapping flat products such as biscuits or chocolate bars, frequently a so-called FIFO-storage cabinet (first-in, first-out storage cabinet) is used in which the products are, according to requirements, stored temporarily after it receives the articles from a simple article-feeding device. Such known article-feeding devices have, however, the disadvantage that their output is inherently low and consequently, the storing speed for charging the FIFO storage cabinets is not optimally high.

SUMMARY OF THE INVENTION

It is an object of the invention to provide an improved method and apparatus of the above-outlined type which has a significantly increased output as compared to conventional devices.

This object and others to become apparent as the specification progresses, are accomplished by the invention, according to which, briefly stated, the apparatus for introducing articles into a storage device includes a feeder conveyor for advancing articles toward the storage device in a direction of advance; a support for movably supporting the feeder conveyor such that its discharge end is movable in a direction transverse to the direction of advance of articles on the feeder conveyor and generally parallel to a direction of motion of article-supporting elements of the storage device at the inlet thereof; a drive for moving the feeder conveyor in the direction of advance; a drive for moving the support to thus displace its discharge end transversely to the direction of advance; and an arrangement for synchronizing the motion of the discharge end of the feeder conveyor with the motion of a selected one of the article-supporting elements for transferring articles from the feeder conveyor to the selected article-supporting element during simultaneous motions of the article-supporting elements, of the feeder conveyor in the direction of advance, and of the discharge end in a direction transverse to the direction of advance.

DESCRIPTION OF THE PREFERRED EMBODIMENT

Figure 1:
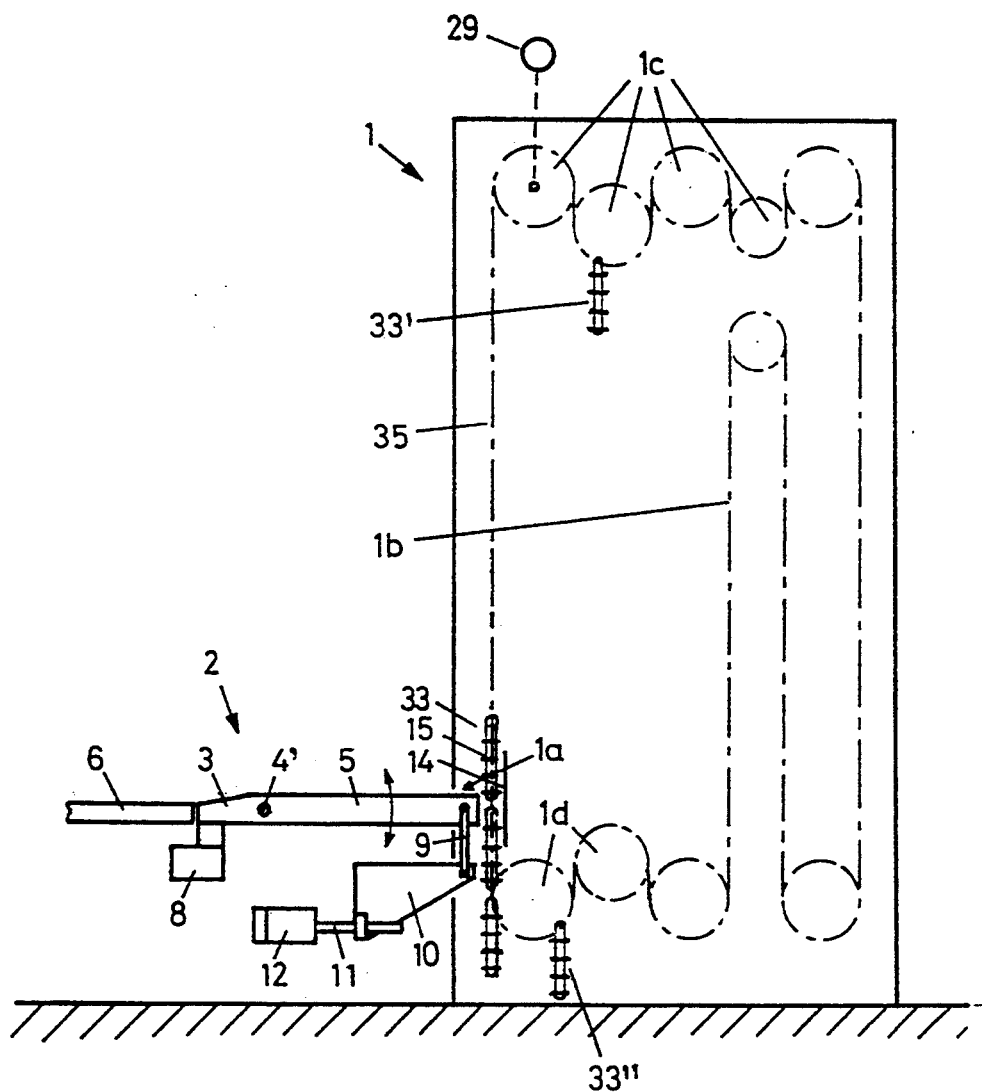
FIG. 1 is a schematic side elevational view of a preferred embodiment of an article-feeding device according to the invention.

Turning to FIG. 1, there is illustrated therein a known FIFO-storage cabinet generally designated at 1 and an article-feeding device (feeder) generally designated at 2 according to a preferred embodiment of the invention. The feeder 2 is situated laterally of an article inlet 1a of the storage cabinet 1 and is supported on a non-illustrated frame. The storage apparatus 1 which may be a flow-through article-storing device, has at least one storage loop 1b.

Figure 2:
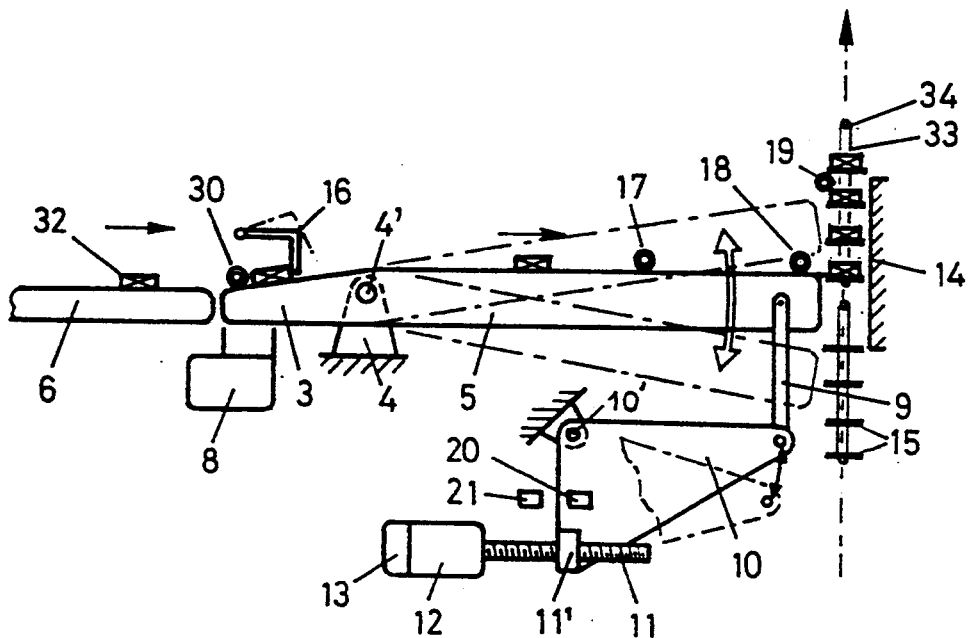
FIG. 2 is a schematic side elevational view of further details of the preferred embodiment.
Figure 3:
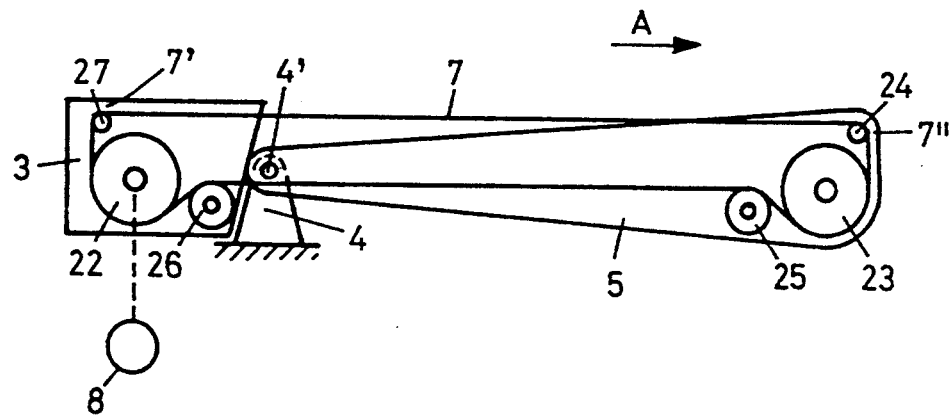
FIG. 3 is a schematic side elevational view of further details of the preferred embodiment.

The feeder 2 is disposed between the discharge end of a conveyor device 6 (on which the articles are advanced in approximate rows 32) and the input 1a of the storage apparatus 1 and has, as illustrated in FIGS. 2 and 3, a stationary frame 3 and an adjoining swingable frame 5 mounted on a bracket 4 for pivotal motion about a horizontal shaft 4'. An endless feeder belt 7 is trained about deflecting rollers 22, 26 and 27 mounted on the stationary frame 3 and deflecting rollers 23, 24, 25 mounted on the pivotal frame 5. The feeder belt 7 is driven by a motor 8 in the direction A, and the two deflecting rollers 27 and 24 define for the feeder belt 7 a feeder inlet 7' and a feeder outlet 7''. As illustrated in FIG. 3, the deflecting roller 24 defining the feeder outlet 7'' has a smaller diameter than the deflecting roller 23 situated in the zone of the feeder outlet 7' immediately adjacent the deflecting roller 24.

The free end of the pivotal frame 5 is, as shown in FIG. 2, coupled by means of a connecting rod 9 with a bell crank lever 10 which is articulated at one of its corners to a stationarily supported pivot 10' for swinging thereabout. Such a swinging motion is effected by a threaded spindle 11 which is driven by a motor 12 and on which a travelling nut 11' is inserted that is affixed to another corner of the bell crank lever 10. The motion of the bell crank lever 10 is limited by opposite limit switches 20 and 21.

The spindle drive motor 12 is controlled by an electric control unit 31 for effecting vertical motions of the outlet 7' of the feed belt 7, as will be described in greater detail below. The belt outlet or discharge end 7' may move vertically through a distance that is substantially greater than the vertical distance between two adjacent shelves 15. This is illustrated in FIG. 2 by the two phantom-line positions of the pivotal frame 5. In the storage device 1 there is provided an article stop 14 which cooperates with the feeder 2 as well as superposed article-supporting elements constituted by flat storage shelves 15 which are spaced at known distances from one another and which serve as supports for the articles to be deposited thereon. The storage shelves 15 are secured between two parallel-running endless chains 1b (only one is shown) trained about supporting rollers 1c. The feeder 2 has, adjacent the discharge end of the conveyor apparatus 6, an article-aligning device 16 for aligning the articles in consecutive rows oriented perpendicularly to the article feeding direction A. For controlling the feeder 2, there are provided an optical barrier 17 between the inlet and outlet ends 7', 7" of the feeder belt 7, an optical barrier 18 at the discharge end 7" and an optical barrier 19 at the inlet 1a of the storage device 1.

Figure 4:
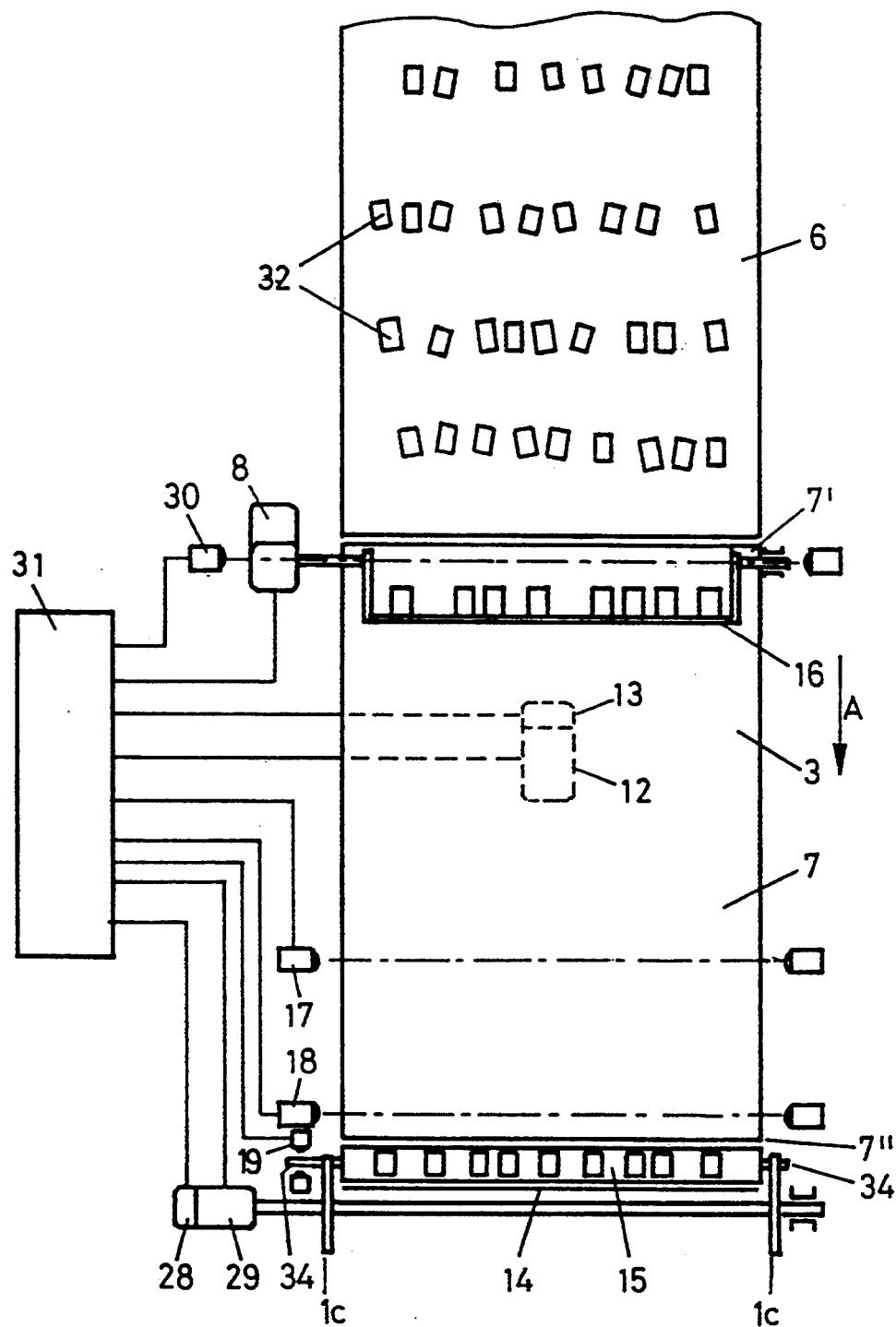
FIG. 4 is a schematic top plan view of the preferred embodiment.

As shown in FIG. 4, the motor 8 circulating the feeder belt 7, the spindle drive motor 12, the incremental signal transmitter 13, the optical barriers 17, 18 and 19 as well as a further optical barrier 30 which is situated at the output end of the conveyor belt 6, and a further incremental transmitter 28 and a drive motor 29 for moving the chain 1b supporting the storage shelves 15 are connected by electric conductors with the electric control unit 31 which controls all the above-listed elements. As incremental transmitter a position indicator may be used. It is to be understood that the sensors may be other than optical barriers. The optical barrier 17 is utilized only in case special products are handled, in order to maintain the accelerations and decelerations of the vertical motions of the feed belt outlet 7" as low as possible.

In the description which follows, the operation of the above-described apparatus will be set forth.

It is an essential feature of the article-feeding device 2 that the discharge end 7' of the feeder belt 7 is, by means of the pivotal belt supporting frame 5, displaced such that it follows the movement of the shelves 15 as they are entrained by the chain 1c to which they are mounted.

The article rows 32 are transferred to the feeder belt 7 at its inlet end 7' from the conveyor 6 preferably with a constant speed and are aligned by the aligning device 16. The optical barrier 30 situated at the aligning device 16 recognizes the incoming articles, and, in response, opens and closes the aligning device 16 if no more article is sensed immediately behind one article row.

The drive motor 8 circulating the feeder belt 7 is set for a predetermined rpm to thus ensure a predetermined belt speed. The aligned article rows, as they travel on the feeder belt 7 along the pivotal frame 5, pass the optical barrier 17 which measures the time lapse between the arrival of two subsequent article rows. The measured value is stored in a shift register of the control unit 31 and subsequently used to control the rpm of the motor 29.

The pivotal frame 5 is, by means of the connecting rod 9 and the lifting device 10, 11, 12 set in such a manner that the outlet end 7" of the feeder belt 7 is situated just above an empty shelf 15 of a storage element.

As the aligned article row passes the optical barrier 18, the shelves 15 move upwardly and the pivotal frame 5 is so controlled in its swinging motion effected by the motor 12, that the discharge end 7" of the feeder belt 7 moves synchronously with the shelves 15. In this manner, a minimum relative motion between the shelves 15 on the one hand and the outlet end 7" of the feeder belt 7 on the other hand is effected so that vibrations, accelerations and jars which would adversely affect the product or could disturb their order are avoided. After passing the optical barrier 18 the aligned article row is, by virtue of the circulation of the feeder belt 7 in the direction A, deposited on a storage shelf 15 with the aid of the article abutment member 14. The properties of the articles are, for this loading function, determinative of the preselected velocity of the feeder belt 7. After sensing the end of the article row, the optical barrier 18 triggers the positioning motion of the discharge end 7" of the feeder belt 7 relative to the successive shelf 15. In this process, in the control unit 31 the time lapse until the arrival of the next row as well as the stored distance to the next shelf is determined in order to compute once again the swinging path of the feeder belt 7. At the same time, the shelf velocity is computed anew as a function of the article row distance and the shelves are brought in a defined gradual manner to the new shelf velocity from the previous shelf velocity.

The vertical swinging motion of the pivotal frame 5, carrying the feeder belt 7 is programmed in such a manner that the articles may be received from the conveyor 6 and deposited on the shelves 15 of the storage device 1 either continuously with a predetermined spacing between consecutive rows and also discontinuously with a random feed of the article rows. In case of a continuous introduction of article rows, the shelves 15 are moved upwardly at a predetermined speed, whereas in case of a discontinuous introduction, the shelves 15 are in a stop-and-go mode and are restarted as a function of the row distance and moved at a newly calculated speed. The computation provides that the swinging motion of the feeder belt 7 is performed within a defined working zone. The position of the shelves 15 and the position of the discharge end 7" of the feeder belt 7 are continuously monitored by the control unit 31 by means of the incremental signal transmitters 13 and 28. In order to compensate for accumulating displacement tolerances, the displacement of the feeder belt 7 is corrected after a determined number of introducing operations with the aid of the optical barrier 19.

Figure 5:
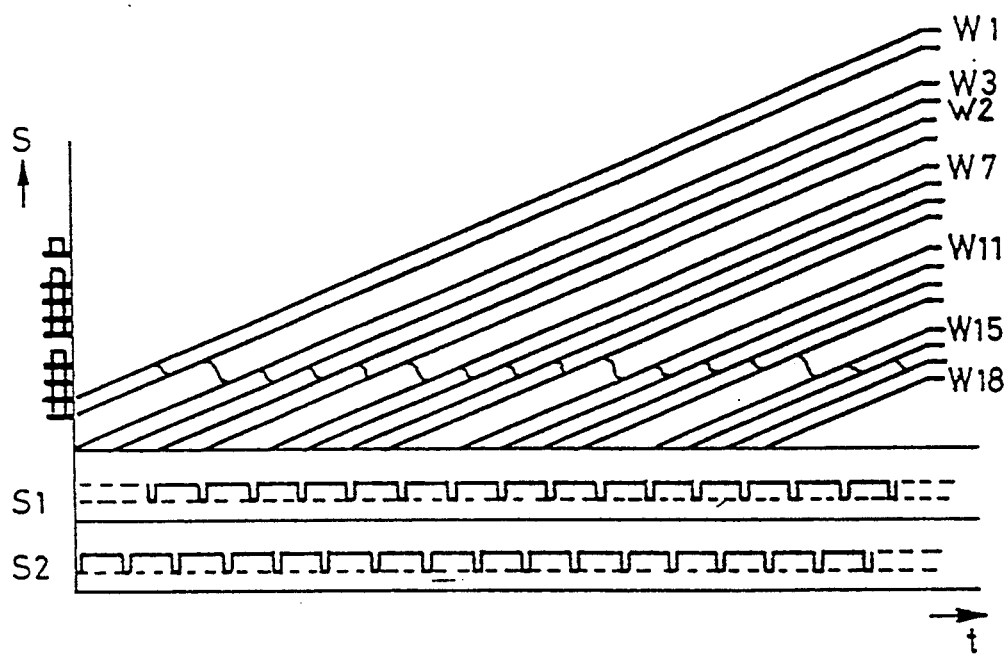
FIG. 5 is a diagram illustrating displacement/time graphs showing a continuous supply of articles according to the method of the invention.
Figure 6:
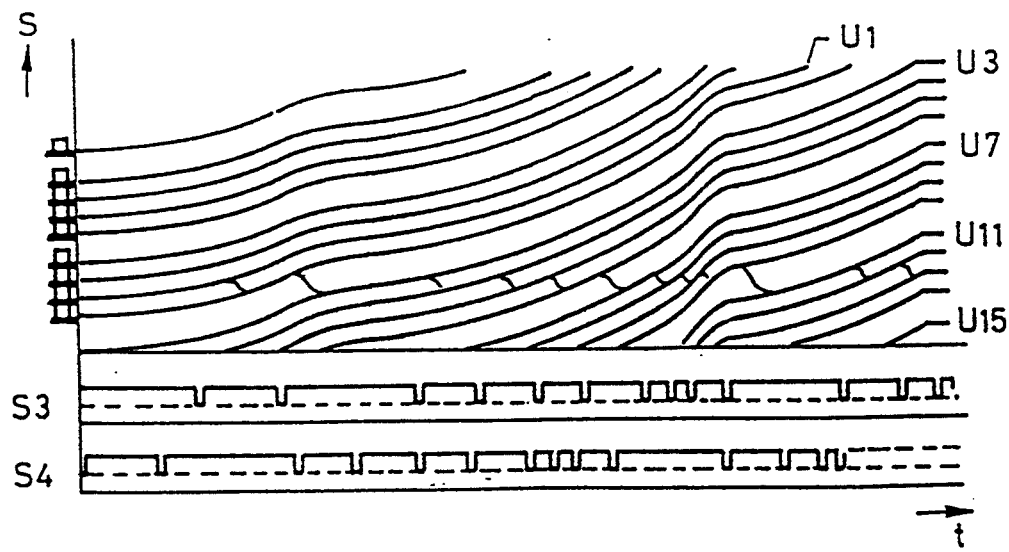
FIG. 6 is a diagram illustrating displacement/time graphs showing a discontinuous supply of articles according to the method of the invention.

In the graphs shown in FIGS. 5 and 6 the abscissa signifies time lapse and the ordinate signifies displacement. The pulses S1 and S2 are the output signals of the optical barrier 18 in case of a continuous article feed, whereas the pulses S3 and S4 are the output signals of the optical barrier 17 in case of a discontinuous article feed. The lines or curves W1 to W18 and U1 to U15 correspond to the path travelled by the shelves 15. Thus, considering for example the diagram of FIG. 5, the discharge end 7" of the feeder belt 7 will describe a displacement/time curve as follows: first the discharge end 7" moves from an initial, downward position, simultaneously with a first shelf 15 along curve $W_1$. After transfer of articles has taken place, the discharge end 7" moves downwardly until it arrives into horizontal alignment with the second upwardly moving shelf (situated underneath the first shelf). This downward movement is represented by the short line connecting the curves $W_1$ and $W_2$. Thereupon, the discharge end 7" moves in synchronism with the second shelf along the curve $W_2$ until article transfer onto the second shelf 15 has taken place, whereupon the discharge end 7" again moves downwardly, represented by the short connecting line between curve $W_2$ and curve $W_3$. Such an oscillating up and down motion of the discharge end 7" continues from shelf to shelf.

Figure 7:
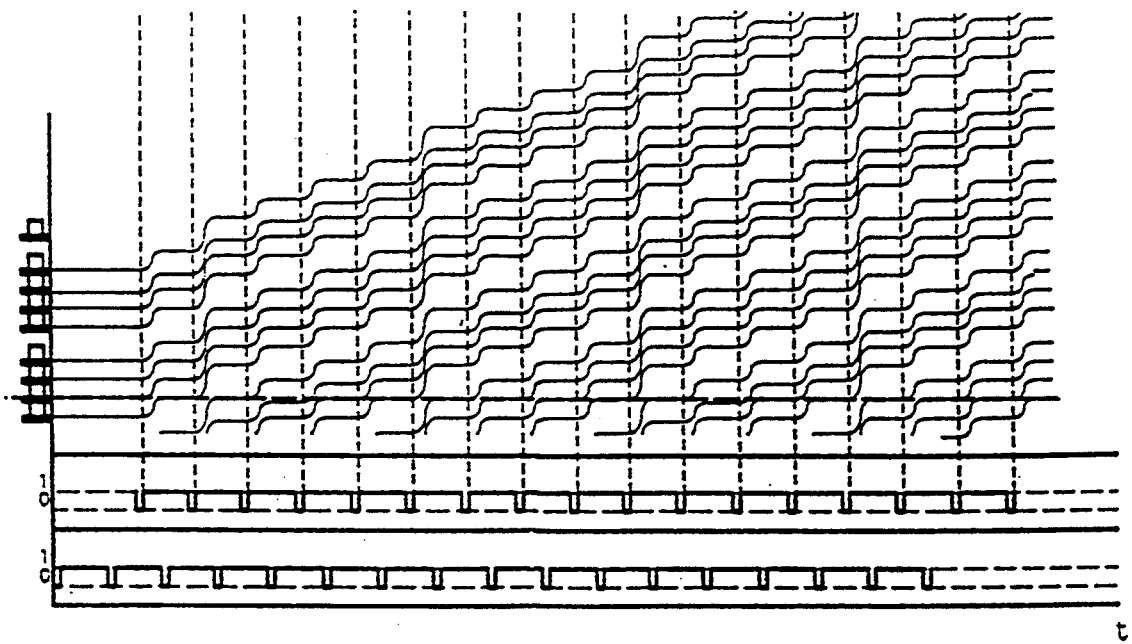
FIG. 7 is a diagram illustrating displacement/time graphs of an article feeding device according to the prior art.

The diagram shown in FIG. 7 illustrates a continuous supply of articles according to the prior art where the shelves execute an intermittent stop-and-go motion. The discharge end of the feeder is stationary and thus the articles are transferred from the feeder belt to the successive shelves as the shelves stop and dwell consecutively at the level of the feeder belt. The disadvantage of such a product introduction resides in the fact that the stopping of the shelves, together with the charging of the shelves in the standstill state and the subsequent acceleration of the shelves generate undesired oscillations and reduce the maximum possible feed rate.

A transfer of the articles from the feeder belt 7 to the shelves 15 is feasible both in motion and at standstill. After the transfer of an article row to a shelf 15, the outlet end 7″ of the feeder belt 7 is automatically brought into alignment with the next successive empty shelf 15 and follows the same until the article row is transferred. The shelf velocity is controlled as a function of the article supply to the storage device 1 and may vary between zero speed (standstill) and a maximum velocity. The velocity changes may be controlled in such a manner that the shelves 15 do not start to oscillate and accordingly, no article shifts on the shelves take place. Furthermore, the chain velocity (that is, the vertical speed of the shelves 15) is controlled in such a manner that the greatest possible number of shelves is filled to optimally ensure that no empty shelves leave the outlet end 7″ of the feeder belt 7. The outlet end 7″ of the feeder belt 7 follows the motion of the shelves 15 as a function of the vertical space between the shelves and the vertical shelf velocity. As a parameter for controlling the shelf velocity, the position of the outlet end 7″ of the feeder belt 7 and the product flow may be considered. This permits a vertical swinging motion of the feeder belt 7 in an optimal functional zone. The circulating speed of the feeder belt 7 may be set preferably as a function of the properties of the article to be handled.

According to the method of the invention, the storage shelves (planes) 15 of the storage device 1 may have a constant speed at least during two loading (article-introducing) operations. For this purpose the optical barrier 17 scans the consecutive product rows 32 and accordingly transmits corresponding pulses to a shift register of the control unit 31.

In production lines the product rows 32 arrive at regular, uniform distances and at a constant rate to the storage device 1. In such a case the rpm of the drive motor 29 for the gondolas 33 is constant as well, so that consecutive shelves 15 have a constant speed during two or more article-introducing operations, as indicated in the diagram of FIG. 5.

In contrast, after the distributing stations the product rows 32 arrive partially at significantly different distances from one another, that is, their feed rate is non-uniform. In such a case the rpm of the drive motor 29 for the gondolas 33 is also not uniform so that the successive shelves 15 have a non-constant speed, as indicated in the diagram of FIG. 6. In such a case, dependent on the distance between the product rows 32, the shelves 15 are moved with a correspondingly lower or higher speed.

It is to be added that upon displacement of the mechanical components, for example, the discharge end 7″ of the feeder belt 7 or the shelves by the motors 12 and 29, the incremental transmitters 13 and 28 apply pulses to the control unit 31.

In particular, upon passage of shelf 15 or a gondola 33, that is, upon passage of a gondola-supporting shaft 34, the optical barrier 19 applies a starting pulse to the control unit 31 whereupon, for the correct control of the motor 12 and the swingable frame 5, the successive pulses of the incremental transmitter 28 indicate to the control unit 31 the exact position of the shelf 15 or the gondola 33.

Each gondola 33 swingable about a rotary shaft 34 contains a plurality of shelves 15 (for example, four in number) which are at equal distances from one another, while the distance between successive shelves belonging to different gondolas is greater. In FIGS. 1, 2 and 4 the individual gondolas 33′ are shown at the upper end rollers and are designated at 33″ at the lower end rollers.

The invention makes possible a gentle shelf motion while supply speeds in excess of 60 rows per minute may be present. At the same time, an alignment and maintenance of the article order may be achieved without changing the orientation of the articles or damaging the same which is of advantage at the output side of the storage device in the further transport of the articles therefrom. The invention makes possible to deposit individual articles as well as entire aligned article rows. To place the apparatus in operational readiness, the discharge end 7″ of the feeder belt 7 is moved downwardly until the lower limit switch 21 is passed. The shelves 15 are moved upwardly until the optical barrier 19 which transmits signals for the reference point correction, is passed. Thereafter, the control device computes a possible common dead center to which an empty shelf and the discharge end 7″ of the feeder belt 7 are height-adjusted. In this computed position, the apparatus is then synchronized, and the storage device 1 is ready to receive articles. Thereafter, a signal is generated which indicates readiness for the introduction of articles.

It will be understood that the above description of the present invention is susceptible to various modifications, changes and adaptations, and the same are intended to be comprehended within the meaning and range of equivalents of the appended claims.

What is claimed is:
1. An apparatus for storing articles, comprising
   (a) a storage device including
      (1) an inlet through which articles are received for storage;
      (2) a plurality of article-supporting elements each having an article-supporting surface;
      (3) first support means for holding the article-supporting elements in a movable series and for sequentially presenting the article-supporting elements at said inlet to receive articles; and
      (4) means for driving said first support means for moving said series;
   (b) an article-introducing device situated adjacent said storage device for transferring articles to said article-supporting elements of said storage device; said article-introducing device including
      (1) a feeder conveyor for advancing articles toward the storage device in a direction of advance; said feeder conveyor having a discharge end through which the articles pass upon their transfer to the storage device;
      (2) second support means for movably supporting said feeder conveyor such that said discharge end is movable in a direction transverse to said direction of advance and generally parallel to a direction of motion of said article-supporting elements at said inlet of the storage device;
      (3) means for driving said feeder conveyor in said direction of advance; and

(4) means for driving said second support means for moving said discharge end; and (c) means for synchronizing the motion of said discharge end of said feeder conveyor with the motion of a selected one of said article-supporting elements for transferring articles from said feeder conveyor to said selected article-supporting element during simultaneous motions of said article-supporting elements, of said feeder conveyor in said direction of advance, and of said discharge end in a direction transverse to said direction of advance; said means for synchronizing comprising (1) sensor means for generating signals for determining a relative position between said discharge end and an article-supporting element; and (2) a control unit for controlling said means for driving said feeder conveyor and said means for driving said second support means as a function of said signals; said means for driving said feed conveyor, said means for driving said second support means, and said sensor means being connected to said control unit.

2. The apparatus as defined in claim 1, wherein said second support means includes a frame for supporting said feeder conveyor and means for pivotally mounting said frame.

3. The apparatus as defined in claim 1, wherein said means for driving said second support means comprises (a) a drive motor;
(b) a threaded spindle connected to said drive motor for axially rotating said spindle;
(c) a travelling nut threadedly inserted on said spindle; and
(d) a linkage mechanism connected to said travelling nut and said frame.

4. The apparatus as defined in claim 1, wherein said feeder conveyor has consecutive first and second length portions; said second length portion being situated downstream of said first length portion as viewed in said direction of advance; further wherein said second support means movably supports solely said second length portion; said feeder conveyor having an inlet at said first length portion thereof; further comprising an article aligning means for sequentially forming rows of articles on said feeder conveyor at said inlet thereof in an orientation perpendicular to said direction of advance.

5. An apparatus for storing articles, comprising (a) a storage device including
(1) an inlet through which articles are received for storage;
(2) a plurality of article-supporting elements each having an article-supporting surface;
(3) first support means for holding the article-supporting elements in a movable series and for sequentially presenting the article-supporting elements at said inlet to receive articles; and
(4) means for driving said first support means for moving said series;

(b) an article-introducing device situated adjacent said storage device for transferring articles to said article-supporting elements of said storage device; said article-introducing device including (1) a feeder conveyor for advancing articles toward the storage device in a direction of advance; said feeder conveyor having a discharge end through which the articles pass upon their transfer to the storage device;

(2) second support means for movably supporting said feeder conveyor such that said discharge end is movable in a direction transverse to said direction of advance and generally parallel to a direction of motion of said article-supporting elements at said inlet of the storage device;

(3) means for driving said feeder conveyor in said direction of advance; and (4) means for driving said second support means for moving said discharge end; and (c) means for synchronizing the motion of said discharge end of said feeder conveyor with the motion of a selected one of said article-supporting elements for transferring articles from said feeder conveyor to said selected article-supporting element during simultaneous motions of said article-supporting elements, of said feeder conveyor in said direction of advance, and of said discharge end in a direction transverse to said direction of advance; said means for synchronizing comprising (1) sensor means for generating a signal upon passage of the articles through a predetermined location on said feeder conveyor and for generating a signal for determining a position of said article-supporting element; said sensor means comprising (i) a first sensor means for generating a signal upon passage of the articles through a location on said feeder conveyor; and (ii) a second sensor means for generating a signal for determining a relative position between said discharge end and said article-supporting element; and (2) a control unit for controlling said means for driving said feeder conveyor and said means for driving said second support means as a function of said signals; said means for driving said feed conveyor, said means for driving said second support means, and said first and second sensor means being connected to said control unit.

6. The apparatus as defined in claim 5, wherein said sensor means further comprises a third sensor means for generating a signal upon passage of the articles through said discharge end; said third sensor means being connected to said control unit.

7. An apparatus for storing articles, comprising (a) a FIFO storage device including
(1) an inlet through which articles are received for storage;
(2) a plurality of article-supporting elements each having a flat article-supporting surface and each being at a distance from one another in a predetermined direction;
(3) first support means for holding the article-supporting elements in a movable series and for sequentially presenting the article-supporting elements at said inlet to receive articles; and
(4) means for driving said first support means for moving said series in said predetermined direction at said inlet of the storage device;

(b) an article-introducing device situated adjacent said storage device for transferring articles to said article-supporting elements of said storage device; said article-introducing device including (1) a feeder conveyor for advancing articles toward the storage device in a direction of advance; said feeder conveyor having a discharge end through which the articles pass upon their transfer to the storage device;

(2) second support means for movably supporting said feeder conveyor such that said discharge end is movable in a direction transverse to said direction of advance and generally parallel to said direction of motion of said article-supporting elements at said inlet of the storage device; said discharge end having an amplitude of motion greater than said distance between said article-supporting elements;

(3) means for driving said feeder conveyor in said direction of advance; and (4) means for driving said second support means for moving said discharge end; and (c) means for synchronizing the motion of said discharge end of said feeder conveyor with the motion of a selected one of said article-supporting elements for transferring articles from said feeder conveyor to said selected article-supporting element during simultaneous motions of said article-supporting elements, of said feeder conveyor in said direction of advance, and of said discharge end in a direction transverse to said direction of advance; said means for synchronizing comprises (1) sensor means for generating signals for determining a relative position between said discharge end and an article-supporting element; and (2) a control unit for controlling said means for driving said feeder conveyor and said means for driving said second support means as a function of said signals; said means for driving said feed conveyor, said means for driving said second support means, and said sensor means being connected to said control unit.

8. The apparatus as defined in claim 7, wherein said second support means includes a frame for supporting said feeder conveyor and means for pivotally mounting said frame.

9. The apparatus as defined in claim 7, wherein said means for driving said second support means comprises
 (a) a drive motor;
 (b) a threaded spindle connected to said drive motor for axially rotating said spindle;
 (c) a travelling nut threadedly inserted on said spindle; and
 (d) a linkage mechanism connected to said travelling nut and said frame.

10. The apparatus as defined in claim 7, wherein said feeder conveyor has consecutive first and second length portions; said second length portion being situated downstream of said first length portion as viewed in said direction of advance; further wherein said second support means movably supports solely said second length portion; said feeder conveyor having an inlet at said first length portion thereof; further comprising an article aligning means for sequentially forming rows of articles on said feeder conveyor at said inlet thereof in an orientation perpendicular to said direction of advance.

11. An apparatus for storing articles, comprising
(a) a storage device including
 (1) an inlet through which articles are received for storage;
 (2) a plurality of article-supporting elements each having an article-supporting surface;
 (3) first support means for holding the article-supporting elements in a movable series and for sequentially presenting the article-supporting elements at said inlet to receive articles; and
 (4) means for driving said first support means for moving said series;

(b) an article-introducing device situated adjacent said storage device for transferring articles to said article-supporting elements of said storage device; said article-introducing device including
 (1) a feeder conveyor for advancing articles toward the storage device in a direction of advance; said feeder conveyor having a discharge end through which the articles pass upon their transfer to the storage device; said feeder conveyor including a feed belt and a plurality of deflecting rollers about which said feed belt is trained; a first of said deflecting rollers defining said discharge end and a second of said deflecting rollers being situated immediately adjacent said discharge end in a zone thereof; said first deflecting roller having a smaller diameter than said second deflecting roller;

(2) second support means for movably supporting said feeder conveyor such that said discharge end is movable in a direction transverse to said direction of advance and generally parallel to a direction of motion of said article-supporting elements at said inlet of the storage device;

(3) means for driving said feeder conveyor in said direction of advance; and (4) means for driving said second support means for moving said discharge end; and (c) means for synchronizing the motion of said discharge end of said feeder conveyor with the motion of a selected one of said article-supporting elements for transferring articles from said feeder conveyor to said selected article-supporting element during simultaneous motions of said article-supporting elements, of said feeder conveyor in said direction of advance, and of said discharge end in a direction transverse to said direction of advance.

12. The apparatus as defined in claim 11, wherein said second support means includes a frame for supporting said feeder conveyor and means for pivotally mounting said frame.

13. The apparatus as defined in claim 11, wherein said means for driving said second support means comprises
 (a) a drive motor;
 (b) a threaded spindle connected to said drive motor for axially rotating said spindle;
 (c) a travelling nut threadedly inserted on said spindle; and
 (d) a linkage mechanism connected to said travelling nut and said frame.

14. The apparatus as defined in claim 11, wherein said feeder conveyor has consecutive first and second length portions; said second length portion being situated downstream of said first length portion as viewed in said direction of advance; further wherein said second support means movably supports solely said second length portion; said feeder conveyor having an inlet at said first length portion thereof; further comprising an article aligning means for sequentially forming rows of articles on said feeder conveyor at said inlet thereof in an orientation perpendicular to said direction of advance.

* * * * *